US 009917911 B2

(12) United States Patent
Lee et al.

(10) Patent No.: US 9,917,911 B2
(45) Date of Patent: Mar. 13, 2018

(54) SECURITY SYSTEM COMMUNICATIONS MANAGEMENT

(71) Applicant: MivaLife Mobile Technology, Inc., George Town (KY)

(72) Inventors: Kuochun Lee, Fremont, CA (US); Yan Qi, Fremont, CA (US); Qiang Xie, Wuhan (CN)

(73) Assignee: MivaLife Mobile Technology, Inc., George Town (KY)

( * ) Notice: Subject to any disclaimer, the term of this patent is extended or adjusted under 35 U.S.C. 154(b) by 27 days.

(21) Appl. No.: 14/030,597

(22) Filed: Sep. 18, 2013

(65) Prior Publication Data

US 2015/0077250 A1  Mar. 19, 2015

(51) Int. Cl.
*H04L 29/08* (2006.01)
*G08B 13/196* (2006.01)
*G08B 25/10* (2006.01)

(52) U.S. Cl.
CPC ........ *H04L 67/26* (2013.01); *G08B 13/19656* (2013.01); *G08B 25/10* (2013.01); *H04L 67/145* (2013.01)

(58) Field of Classification Search
CPC .. H04L 63/08; H04L 12/2809–12/2818; H04L 2012/2841; H04L 63/10; H04L 67/26; G08B 25/14
See application file for complete search history.

(56) References Cited

U.S. PATENT DOCUMENTS

| 5,619,657 | A  | * | 4/1997  | Sudama et al. ............... 709/225 |
| 6,421,781 | B1 | * | 7/2002  | Fox et al. ......................... 726/4 |
| 6,757,822 | B1 | * | 6/2004  | Feiertag et al. ............. 713/152 |
| 7,856,493 | B1 | * | 12/2010 | Pithawala et al. ........... 709/223 |
| 8,402,525 | B1 | * | 3/2013  | Shah et al. ......................... 726/8 |
| 8,949,597 | B1 | * | 2/2015  | Reeves et al. ................ 713/156 |
| 2003/0196082 | A1 | * | 10/2003 | Fukuyama .................... 713/153 |
| 2004/0068665 | A1 | * | 4/2004  | Fox et al. ..................... 713/201 |
| 2004/0088546 | A1 | * | 5/2004  | Shah et al. .................... 713/168 |
| 2004/0123147 | A1 | * | 6/2004  | White .......................... 713/201 |
| 2004/0263314 | A1 | * | 12/2004 | Dorai et al. ................... 340/5.2 |
| 2005/0120214 | A1 | * | 6/2005  | Yeates et al. ................. 713/171 |
| 2005/0227669 | A1 | * | 10/2005 | Haparnas ...................... 455/410 |
| 2006/0053290 | A1 | * | 3/2006  | Randle et al. ................ 713/169 |
| 2006/0107036 | A1 | * | 5/2006  | Randle et al. ................ 713/153 |
| 2006/0271695 | A1 | * | 11/2006 | Lavian .......................... 709/229 |
| 2007/0279527 | A1 | * | 12/2007 | Dorai et al. ................... 348/552 |
| 2009/0070681 | A1 | * | 3/2009  | Dawes et al. ................. 715/736 |

(Continued)

*Primary Examiner* — Orlando Bousono
(74) *Attorney, Agent, or Firm* — Fish & Richardson P.C.

(57) ABSTRACT

Methods, systems, and apparatus, including computer programs encoded on computer storage media, for managing communications. One of the systems includes a plurality of security systems, each security system including a secure network coupling a plurality of security devices; a plurality of user devices authorized to send and receive communications associated with a respective security system of the plurality of security systems; and a service provider system configured to manage communications for each of the plurality of security systems with respective user devices, wherein, the service provider system or the user devices are configured to communicate with a push service to send push notifications.

23 Claims, 6 Drawing Sheets

(56) References Cited

U.S. PATENT DOCUMENTS

| | | |
|---|---|---|
| 2009/0271847 A1* | 10/2009 | Karjala et al. .................... 726/6 |
| 2009/0305667 A1* | 12/2009 | Schultz ......................... 455/410 |
| 2010/0100939 A1* | 4/2010 | Mahaffey et al. ................ 726/4 |
| 2011/0093938 A1* | 4/2011 | Asokan et al. ................... 726/7 |
| 2011/0162036 A1* | 6/2011 | Heo ................................ 726/1 |
| 2012/0054847 A1* | 3/2012 | Schultz et al. ................... 726/9 |
| 2012/0066608 A1* | 3/2012 | Sundermeyer et al. ...... 715/738 |
| 2012/0066632 A1* | 3/2012 | Sundermeyer et al. ...... 715/771 |
| 2012/0188072 A1* | 7/2012 | Dawes et al. ................. 340/514 |
| 2012/0324592 A1* | 12/2012 | Korablev et al. .............. 726/30 |
| 2013/0219474 A1* | 8/2013 | Kuhnen et al. .................. 726/4 |
| 2013/0268645 A1* | 10/2013 | Shah et al. .................... 709/223 |
| 2013/0291087 A1* | 10/2013 | Kailash et al. ................ 726/11 |
| 2014/0007213 A1* | 1/2014 | Sanin et al. ...................... 726/9 |
| 2014/0020070 A1* | 1/2014 | Angal ............................... 726/5 |
| 2014/0035741 A1* | 2/2014 | Morehead .................... 340/501 |
| 2014/0143695 A1* | 5/2014 | Sundermeyer et al. ...... 715/765 |
| 2014/0293046 A1* | 10/2014 | Ni ................................. 348/143 |

\* cited by examiner

SECURITY SYSTEM COMMUNICATIONS MANAGEMENT

BACKGROUND

This specification generally relates to communications management.

Conventional security systems can include one or more security cameras and/or one or more sensors positioned at different points of a security system location, e.g., a home or office. Some conventional home security systems use a public switched telephone network (PSTN) to transmit alerts to an authorized call service provider using dual-tone multi frequency (DTMF) signaling. A live operator at the call service provider services incoming alarms, e.g., by calling the police.

In some conventional security systems, local security management devices are communicatively coupled with a service provider system using a regular heartbeat signal transmitted to the service provider system. This heartbeat signal can be used to keep a connection to the service provider system open and ready at all times to allow communication from the local security system or from a remote user to the local security system.

SUMMARY

In general, one innovative aspect of the subject matter described in this specification can be embodied in systems including multiple security systems, each security system including a secure network coupling multiple security devices; multiple user devices authorized to send and receive communications associated with a respective security system of the multiple security systems; and a service provider system configured to manage communications for each of the multiple security systems with respective user devices, wherein, the service provider system or the user devices are configured to communicate with a push service to send push notifications.

The foregoing and other embodiments can each optionally include one or more of the following features, alone or in combination. The multiple security devices include one or more of sensor devices and camera devices and wherein the multiple security devices are communicatively coupled to a security management device. The security management device is configured to initiate a communication with the service provider system in response to an event triggered by one or more security devices. The security management device is configured to initiate a communication to the service provider in response to receiving a push notification. The security management device is configured to behave as a mobile device capable of receiving push notifications from the push service. The service provider system is configured to communicate with the push service to send a push notification to a particular security system in response to a request for security data received from a user device associated with the particular security system. The service provider system is configured to communicate with the push service to send a push notification to a particular user device in response to receiving an event notification from a particular security system. The service provider system is configured to perform authentication before establishing authorized communication with respective user device.

In general, one innovative aspect of the subject matter described in this specification can be embodied in methods that include the actions of receiving at a service provider system an event notification from a particular security system of multiple security systems, the event notification being generated in response to one or more sensor triggers; determining a user device associated with the security system; and sending a communication to a push service, the communication requesting a push notification be sent to the identified user device, the push notification identifying the event received from the security system. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Receiving an event notification includes receiving an indication that a security device has been triggered. Determining a user device associated with the security system includes determining one or more authorized users and determining a user device to notify based on one or more notification rules. Sending the communication to the push service includes providing the push service with an identifier of the user device and content for the push notification.

In general, one innovative aspect of the subject matter described in this specification can be embodied in methods that include the actions of receiving at a service provider system, a request from a user device for security data associated with a particular security system; authenticating the user request; sending a communication to a push service, the communication requesting a push notification be sent to the particular security system; receiving a communication request from the security system in response to receiving the push notification; receiving security data responsive to the user device request; and passing the security data to the user device. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Authenticating the user request includes validating the user device association with the particular security system of multiple security systems. The push notification includes an identification of the requested security data. The push notification includes an identifier for the security system. In response to receiving the communication request from the security system, providing an identification of the requested security data. The requested security data is video content from a security camera of the security system.

In general, one innovative aspect of the subject matter described in this specification can be embodied in methods that include the actions of sending a request to establish communication to a service provider system; sending a communication to a push service, the communication requesting a push notification be sent to a particular security system; and receiving security data from the service provider system, wherein the security data is provided by the security system to the service provider system in response to the push notification. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. An authorized user device sends the request to the service provider system and the communication to the push service. The push notification includes an identifier for the security system associated with a user device. The push notification includes an identification of the requested security data.

Particular embodiments of the subject matter described in this specification can be implemented so as to realize one or more of the following advantages. The bandwidth consumption and loading of a server or cloud based service provider system can be reduced during a no-event period. When events occur, the system consumes necessary resources. This can greatly reduce the cost of the system operation.

In some implementations, different levels of service can be provided, for example, at different pricing. One level of service can maintain constant communication between the service provider system and the respective local security system. Another level of service users event based or on demand communication.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In conventional security systems based on a public switched telephone network ("PSTN") connection, the security system will "call" the service provider through the PSTN if an event triggered. An advantage of PSTN based system is that the system does not need to maintain a line (connection) to the service provider. The telephone switching system will automatically route the call (or select a line) to the service provider.

However, newer security systems are based on using a computer network, e.g., the Internet, for example as part of an internet protocol "IP" network. As such, these systems typically need to maintain a "logical" connection from the local security system to server side service provider. In other words, the local system acts like a client and it connects to server constantly. This is due to the Internet model and home router firewall. Consequently, the server generally cannot connect to home device through the computer network if the user wants to access the home video using, e.g., a smartphone. Therefore, to maintain a remote service, e.g., cloud or server based, to the security system a logical network connection needs to be established. This can consume a large amount of CPU and bandwidth as the number of security system increases. Consequentially, the operation cost in normal mode will generate a high maintenance cost. The following description discloses systems and methods to reduce the resource usage at the service provider side while no event is triggered. In particular, when an event occurs or when a mobile user device seeks local security system data, a push notification from the service provider or other third party push service is used to wake up the system. Then, the connection will be established for any communication.

Figure 1:
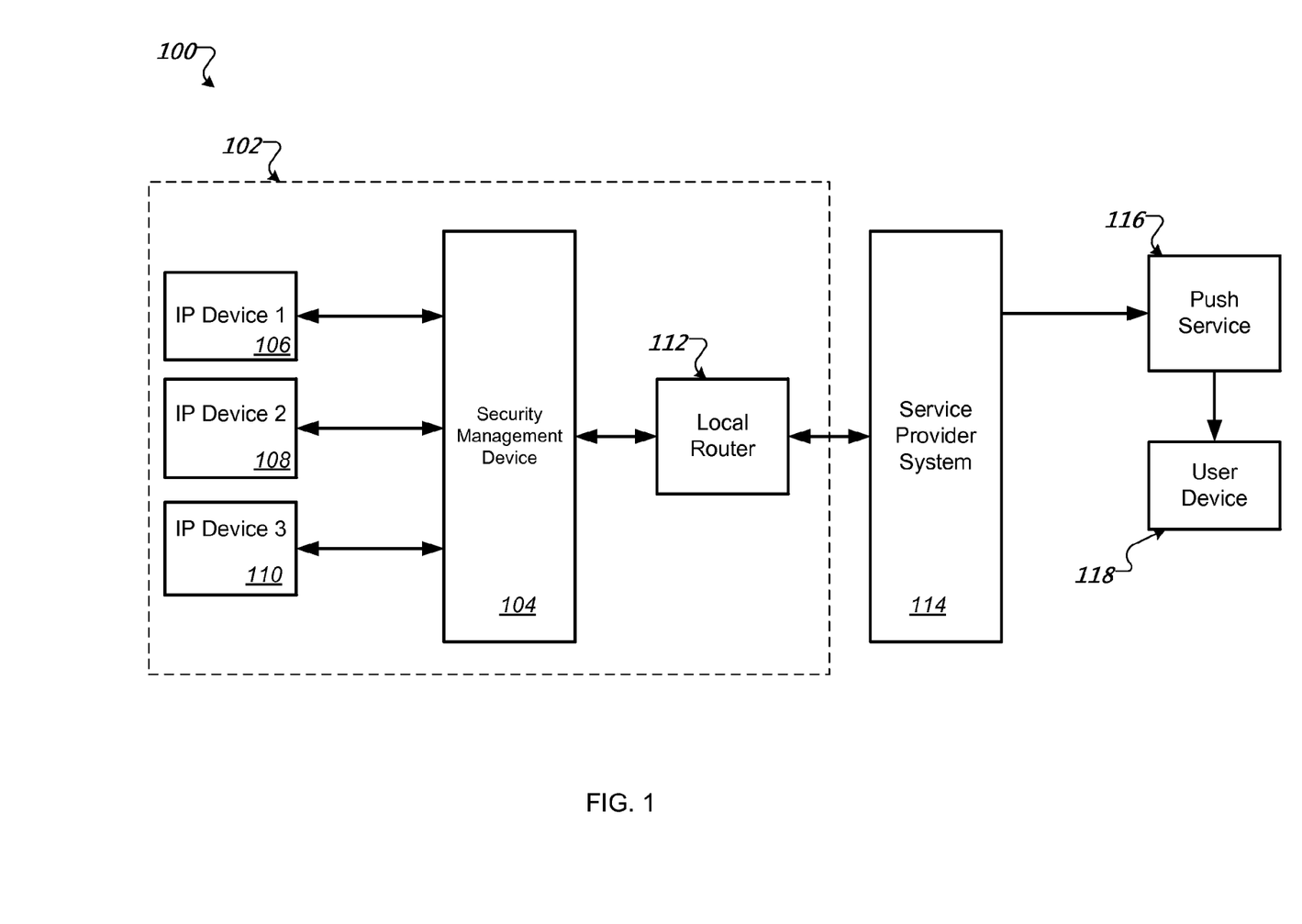
FIG. 1 is a block diagram of a system for using a push service to provide security event notifications.

FIG. 1 is a block diagram of a system 100 for using a push service to provide security event notifications. The system 100 includes a local security system 102 that is communicatively coupled to a service provider system 114, e.g., through a network (not illustrated).

The local security system 102 includes a security management device 104 and wireless enabled devices 106, 108, and 110. In some implementations, the wireless enabled devices 106, 108, and 110 are communicatively coupled to the security management device 104 through a secure wireless network.

The wireless enabled devices 106, 108, and 110 can include different Internet Protocol (IP) devices such as IP cameras as well as wireless sensors and other devices. For example, in a typical home security system, several strategically positioned cameras and sensors may be included. In addition to sensors included for security purposes such as movement and displacement sensors, for example, detecting the opening of doors and windows, other sensors providing other useful information may be included such as doorbell sensors, smoke detector alarm sensors, temperature sensors, and/or environmental control sensors and/or controls. Additionally, the wireless enabled devices can include actuator devices. The actuator devices can include for example a door actuator that allows for remote locking and unlocking of an associated door.

Video data captured by an IP camera (e.g., video, a video clip, or one or more still images generated from video, can be transmitted by WiFi to the security management device 104 for transmission to the service provider system 114. The security management device 104 can also include an RF transmitter/receiver configured to receive alerts or other communications from the respective sensors, cameras, and other devices. The RF transmitter/receiver can use any suitable RF wireless protocol, in particular those used in home security and automation including, for example, 433 MHz, 426 MHz, 868 MHz, Zwave, Zigbee, WiFi, etc.

The security management device 104 can be an access point device. The security management device 104 can be used to manage the wireless enabled devices 106, 108 and 110, for example, to establish the secure wireless network and to communicate with the service provider system 114. For example, the security management device 104 can send event notifications, e.g., in response to a triggered sensor, to the service provider system 114 which pushes the event notifications to one or more users of the local security system 102. Similarly, the security management device 104 can receive commands and or push notifications from the service provider system 114, e.g., to provide video data to a particular authorized user of the local security system 102 in response to a request, as will be described in greater detail below.

The security management device 104 is communicatively coupled to the service provider system 114, e.g., using a modem or directly to the Internet through an ISP, through a local router 112. In some implementations, the local router 112 can be coupled to one or more modes of communication. For example, a broadband connection mode such as cable or Ethernet, a PSTN telephone connection mode, or a cellular connection mode. In some alternative implementations, the security management device 104 includes a router such that the local router 112 is not necessary.

The security management device 104 can also act as a gatekeeper that provides a single avenue for communication with the service provider system 114. In particular, instead of allowing the wireless enabled devices to communicate directly with the service provider system, e.g., using a 3G dongle, only local communications within the security system, e.g., to the security management device 104, are permitted. This reduces the number of connections between various security systems and the service provider system 114. The security management device 104 can periodically communicate with the wireless enabled devices 106, 108, and 110, for example, to confirm active status. If there is a problem one of the wireless enabled devices, the security management device 104 can notify the service provider system 114 which may in turn notify one or more user devices associated with the security system, e.g., user device 118.

The service provider system 114 provides management and communication functions for the system 100. In particular, while only one local security system 102 is shown, the service provider system 114 can be used to manage multiple different local security systems associated with corresponding users. The service provider system 114 can be one or more servers or a cloud based management system. The service provider system 114 can provide authentication and registration functions for establishing a secure wireless network at the local security system 102 as well as for authenticating user control commands and requests. Furthermore the service provider system 114 can manage communication between the security management device 104 and one or more user devices 118 associated with the local security system 102.

The user device 118 represents various device types that can be used by one or more users to receive security data, e.g., alerts or video streams, and provide control instructions for the local security system 102. For example, the user devices 118 can be one of various types of smartphones that includes a security management application or a web browser for accessing a security management website.

When the user device 118 attempts to interact with the service provider system 114, its authority may be confirmed by the service provider system 114. For example, the user device 118 can provide information that uniquely identifies the requesting device, e.g., an Internet Protocol (IP) address, a product serial number, or a cell phone number. Alternatively, the user may provide a user name and password which are validated to determine authority to interact with the service provider system 114 and to access data associated with the local security system 102. To facilitate such authorization procedures, the service provider system 114 can store, or have ready access to, authorization information for each secure wireless network of users who subscribe to the service. The user device 118 can be used to receive information from the local security system 114, e.g., alarm information, as well as used to control functions of the security system, e.g., to request video data from an IP camera of the local security system 102 (e.g., as wireless enabled device 106).

As shown in the example system 100, the service provider system 114 can communicate with the user device 118 through a push service 116. The push service 116 provides network communication in which the request for a given transaction is initiated by the sender, e.g., a server or publisher. It is contrasted with pull, where the request for the transmission of information is initiated by the receiver or client. Thus, the service provider system 114 can communicate with the push service 116 that then sends a corresponding push notification to the user device 118.

Figure 2:
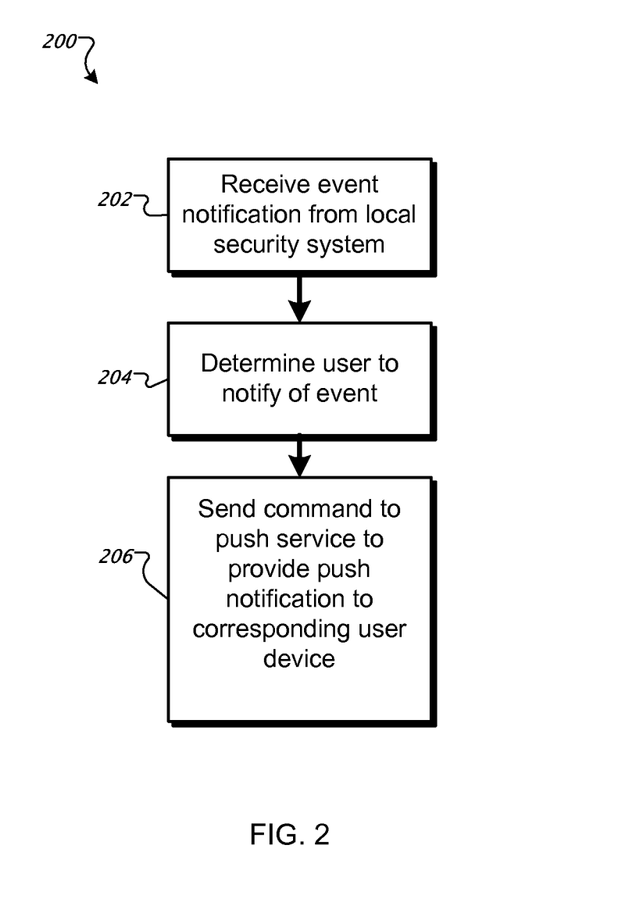
FIG. 2 is a flow diagram of an example method for event notification.

FIG. 2 is a flow diagram of an example method 200 for event notification. For convenience, the method 200 will be described with respect to a system that performs the method, for example, a service provider system, e.g., service provider system 114.

The service provider system receives 202 an event notification from a local security system, e.g., local security system 102. For example, a motion sensor can be triggered within the local security system. This can cause the sensor to notify the local security management device triggering an event. The security management device can initiate communication with the service provider system to notify the service provider system of the event.

The service provider system determines 204 one or more users to notify of the received event. In particular, the service provider system identifies one or more users that are authorized to receive event notifications from particular security system. In some implementations, different users associated with the security system can be notified according to one or more notification rules. For example, one user can be a primary user for receiving event notifications and another user can be a backup user that is notified if certain criteria are satisfied, e.g., a lack of response from the primary user to the event notification.

The service provider system sends 206 a command to a push service, e.g., push service 116, to provide a push notification to the one or more determined users. The service provider system provides event information to the push service as well as an identifier associated with the designated user device to which the push notification is to be sent. The push service then sends the event notification to the corresponding one or more users as a push notification. The user device can receive the push notification without a security application being currently run on the user device.

Figure 3:
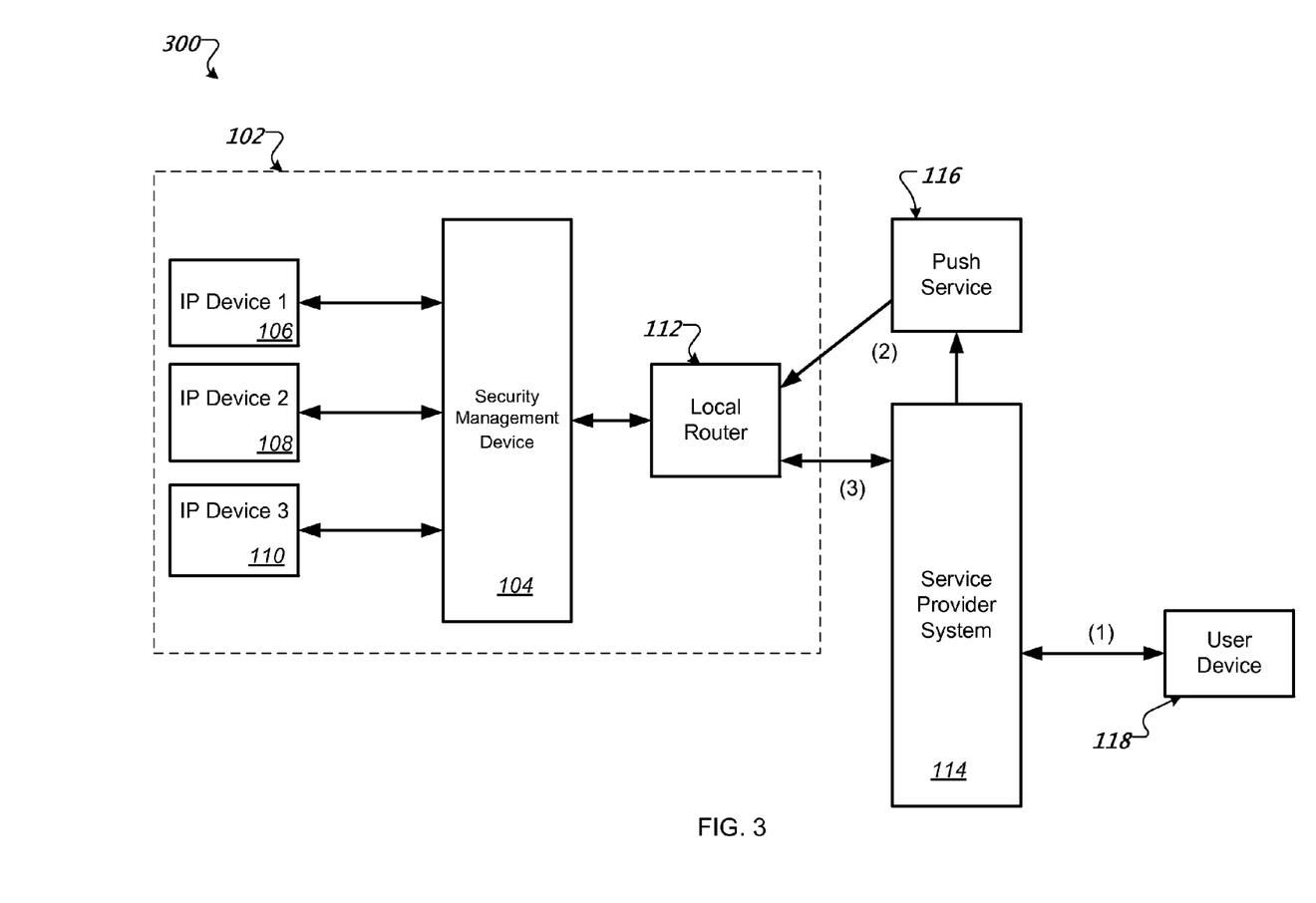
FIG. 3 is a block diagram of a system for using a push service to initiate communication with a local security system.

FIG. 3 is a block diagram of a system 300 for using a push service to initiate communication with a local security system. The system 300 includes the local security system 102 that is communicatively coupled to the service provider system 114, e.g., through a network.

The local security system 102 includes security management device 104 and wireless enabled devices 106, 108, and 110. The wireless enabled devices 106, 108, and 110 can be communicatively coupled to the security management device 104 through a secure wireless network.

The security management device 104 is communicatively coupled, e.g., through an Ethernet connection, to the service provider system 114 through the local router 112. For example, upon establishing communication, the security management device 104 can provide security system data to the service provider system 114. The data can include, for example, video or image data captured by a camera of the local security system 102. Additionally, the security management device 104 can receive push notifications from a push service 116.

The service provider system 114 can receive a user request from the user device 118. The user request can include a request to establish communication with the service provider system 114 as well as a request for particular security system data. For example, the request can be to view video content or an image capture from one or more security cameras of the security system. The service provider system 114 can send authorized data to the user device 118.

The service provider system 114 is also communicatively coupled with the push service 116. The service provider system 114 can communicate with the push service 116 with instructions to send a push notification to the security management device 104. For example, the service provider system 114 can communicate with the push service 116 in response to the received request from the user device 118. In some implementations, the service provider system 114 is continuously coupled to the push service 116 to facilitate on demand communication to respective security systems in response to user device requests.

Figure 4:
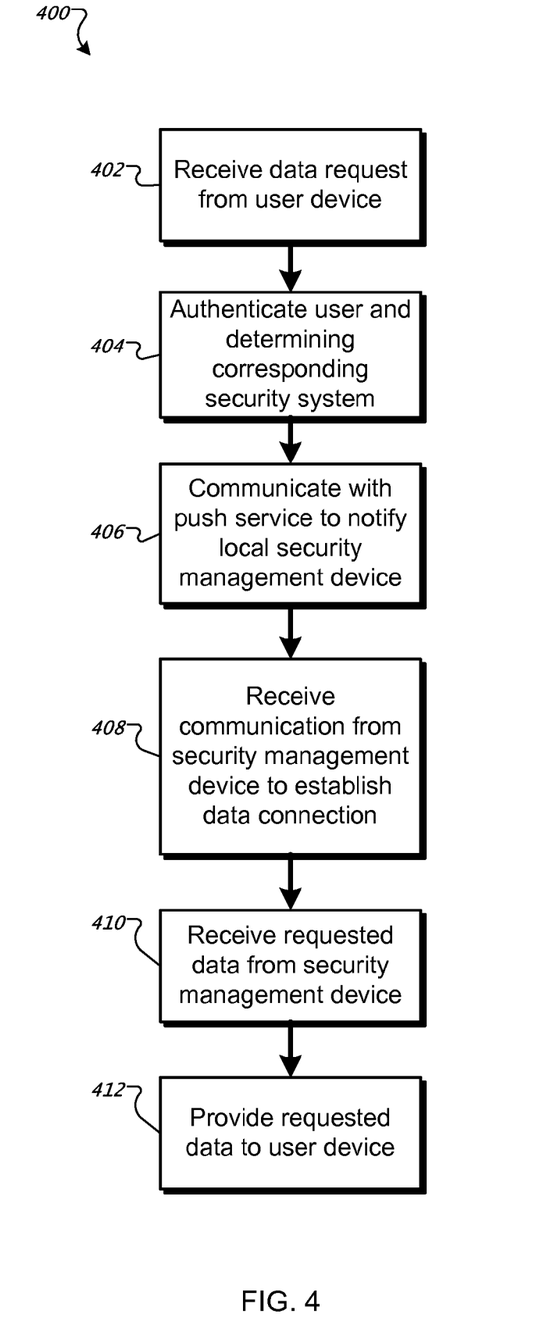
FIG. 4 is a flow diagram of an example method for communicating with a local security system.

FIG. 4 is a flow diagram of an example method 400 for communicating with a local security system. For convenience, the method 400 will be described with respect to a system that performs the method, for example, a service provider system, e.g., service provider system 114.

The service provider system receives 402 a data request from a user device, e.g., user device 118. The received data request can include a request for data from the local security system 102. For example, the request can be to view video content, or one or more individual images, captured from one or more security cameras of the security system.

The service provider system authenticates 404 the user request. For example, the user of the user device can provide a user name and/or password associated with a security account. Additionally, an identifier of the device can be used to validate the user device. For a given security system, multiple users may have security accounts. Additionally, different users may have different levels of permissions governing the data they can receive and valid requests they can make. Thus, in addition to determining that the user is authentic, the authentication by the service provider system can also include validating the request against the permissions of that user account.

For authenticated user requests, the service provider system communicates 406 with a push service, e.g., push service 116, to provide a push notification to the corresponding security management device of the security system associated with the user request. The communication to the push service can include a notification message as well as an identifier of the target security management device, e.g., a unique number such as an account number or a mobile phone number.

In some implementations, the security management device can act as a mobile device similar to a mobile phone and the security management device can therefore be registered, e.g., as a phone. As such, the push notification to the security management device can proceed as a typical push notification to a mobile device.

The service provider system receives 408 a communication from the security management device to communicatively couple the security management device to the service provider system. The service provider system can optionally perform one or more authentication operations before establishing a connection with the security management device.

After communication with the security management device is established, the service provider system receives 410 the data requested by the user device. In some implementations, the requested data is identified in the push notification to the security management device. In some other implementations, the service provider system sends the request to the security management device after communication has been established. The requested data can be video camera footage or other security system data including sensor data as well as usage statistics and other operational details.

The service provider system provides 412 the requested data to the user device. Since the user device has already established communication with the service provider system, the requested data can quickly flow from the security management device to the user device through the service provider system.

For example, the request can be for video data from a particular security camera of the security system. In response to the request, the service provider system contacts the push service to provide a push notification to the security management device. The push notification can indicate that communication should be established and optionally the data that is requested. Once the service provider system receives the requested data, the service provider system passes the data to the user device.

Figure 5:
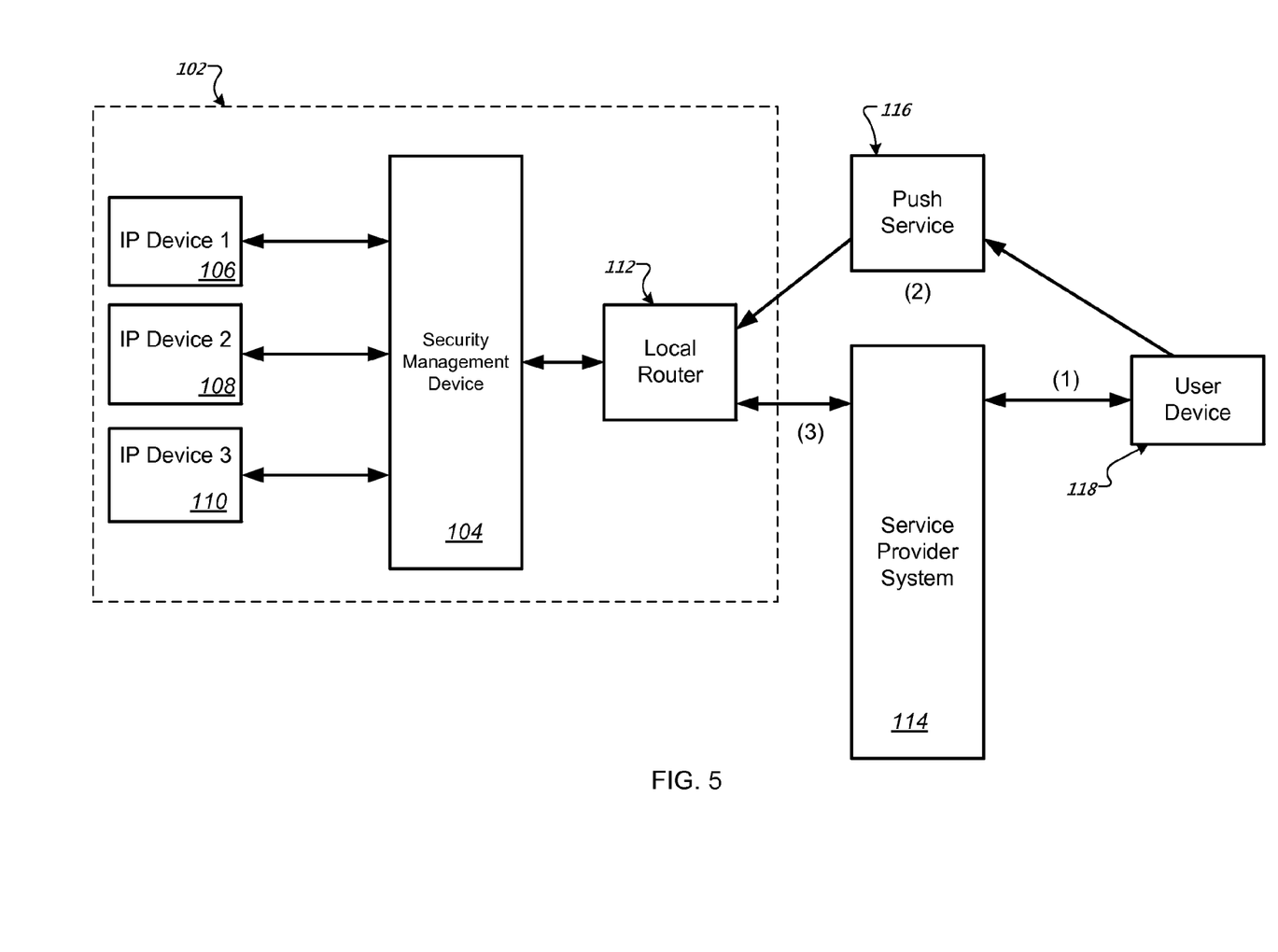
FIG. 5 is a block diagram of another system for using a push service to initiate communication with a local security system.

FIG. 5 is a block diagram of another system 500 for using a push service to initiate communication with a local security system. The system 500 includes the local security system 102 that is communicatively coupled to the service provider system 114, e.g., through a network.

The local security system 102 includes security management device 104 and wireless enabled devices 106, 108, and 110. The wireless enabled devices 106, 108, and 110 can be communicatively coupled to the security management device 104 through a secure wireless network.

The security management device 104 is communicatively coupled, e.g., through an Ethernet connection, to the service provider system 114 through the local router 112. For example, upon establishing communication, the security management device 104 can provide security system data to the service provider system 114. The data can include, for example, video or image data captured by a camera of the local security system 102. Additionally, the security management device 104 can receive push notifications from a push service 116.

The service provider system 114 can receive a user request from the user device 118. The user request can include a request to establish communication with the service provider system 114 as well as a request for particular security system data. For example, the request can be to view video content or an image capture from one or more security cameras of the security system. The service provider system 114 can send authorized data to the user device 118.

The user device 118 is also communicatively coupled with the push service 116. The user device 118 can communicate with the push service 116 with instructions to send a push notification to the security management device 104. In some implementations, the user device 118 is continuously coupled to the push service 116 to facilitate communication to respective security systems in response to user device requests.

Figure 6:
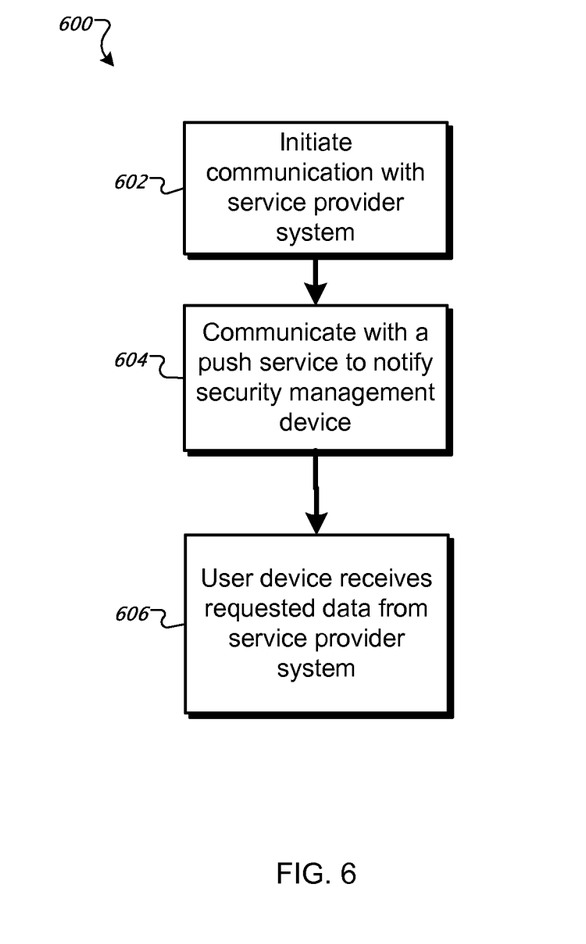
FIG. 6 is a flow diagram of an example method for communicating with a local security system.

FIG. 6 is a flow diagram of an example method 600 for communicating with a local security system. For convenience, the method 600 will be described with respect to a system or device that performs the method, for example, a user device, e.g., user device 118. The user device can include a security application for managing a corresponding security system and for requesting security data.

The user device initiates 602 a communication with a service provider system e.g., service provider system 114. The communication can include providing authentication information in order to establish communication for receiving security data from a security system associated with the user device.

For example, the user of the user device can provide a user name and/or password associated with a security account. Additionally, an identifier of the device can be used to validate the user device. For a given security system, multiple users may have security accounts. Additionally, different users may have different levels of permissions governing the data they can receive and valid requests they can make. Thus, in addition to determining that the user is authentic, the authentication by the service provider system can also include validating the request against the permissions of that user account.

The user device also communicates 604 with a push service, e.g., push service 116, to provide a push notification to the corresponding security management device of the security system associated with the user. The communication to the push service can include a notification message for the security management device as well as an identifier of the target security management device, e.g., a unique number such as an account number or a mobile phone number that allows the push service to identify the security management device. The notification message can include a specific data request, e.g., a video clip or other sensor data, to be provided to the user device.

In some implementations, the security management device can act as a mobile device similar to a mobile phone and the security management device can therefore be registered, e.g., as a phone. As such, the push notification to the security management device can proceed as a typical push notification to a mobile device.

The service provider system receives communication from the security management device to communicatively couple the security management device to the service provider system. The service provider system can optionally perform one or more authentication operations before establishing a connection with the security management device.

Once communication with the security management device is established, the service provider system receives the data requested by the user device. In some implementations, the requested data is identified in the push notification to the security management device. In some other implementations, the service provider system sends the request to the security management device after communication has been established. The requested data can be video camera footage or other security system data including sensor data as well as usage statistics and other operational details.

The user device receives 606 the requested data from the service provider system. The service provider system provides the requested data to the user device after receiving the data from the security management device of the local security system. Since the user device has already established communication with the service provider system, the requested data can quickly flow from the security management device to the user device through the service provider system.

For example, the request can be for video data from a particular security camera of the security system. The user device can both communicate with the service provider system for authentication to receive data from the security system. The user device can further communicate with a push service to provide a push notification of the request for video data to the security management device of the security system. The push notification can indicate that communication should be established with the service provider system and the data that is requested. Once the service provider system receives the requested data from the security management device, the service provider system passes the data to the user device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   a plurality of security systems, each security system including a secure network coupling a plurality of security devices including one or more sensors and a local management device;
   a plurality of user devices separate and distinct from the plurality of security systems, wherein each user device is associated with a particular security system of the plurality of security systems and wherein each user device is authorized to send and receive communications associated with the particular security system of the plurality of security systems that is associated with the user device; and
   a service provider server system configured to remotely manage communications for each security system of the plurality of security systems with one or more user devices of the plurality of user devices that are associated with the security system,
   wherein, the service provider server system is configured to communicate with a third party push service including communicating one or more commands to send separate push notifications to particular security systems of the plurality of security systems in response to a request received from an associated user device and to send push notification to particular user devices of the plurality of user devices in response to a received event from an associated security system indicating a sensor of the particular security system has been triggered, and wherein communication between each particular security system and each particular user device is established in response to a corresponding push notification associated with that security system and user device.

2. The system of claim 1, wherein the plurality of security devices include one or more of sensor devices and camera devices and wherein the plurality of security devices are communicatively coupled to a security management device.

3. The system of claim 2, wherein the security management device is configured to initiate a communication with the service provider system in response to an event triggered by one or more security devices of the plurality of security devices.

4. The system of claim 2, wherein the security management device is configured to initiate a communication to the service provider in response to receiving a push notification.

5. The system of claim 2, wherein the security management device is configured to behave as a mobile device capable of receiving push notifications from the push service.

6. The system of claim 1, wherein the service provider server system is configured to communicate with the push service to send a push notification to a particular security system in response to a request for security data received from a user device associated with the particular security system.

7. The system of claim 1, wherein the service provider server system is configured to communicate with the push service to send a push notification to a particular user device in response to receiving an event notification from a particular security system.

8. The system of claim 1, wherein the service provider server system is configured to perform authentication before establishing authorized communication with a particular user device of the plurality of user devices.

9. A method comprising:
   receiving, at a service provider server system, an event notification from a particular local security system of a plurality of local security systems, wherein each local security system includes a plurality of sensors and a local management device, and wherein the event notification is generated in response to a triggering of one or more sensors of the particular local security system;
   determining, by operation of the service provider server system, a user device associated with the particular local security system but distinct from the particular local security system that corresponds to a user authorized to receive event notifications from the particular local security system; and
   sending, by operation of the service provider server system, a communication to a push service, the communication including one or more commands requesting a push notification be sent to the determined user device, the push notification identifying the event received from the particular local security system indicating that one of the sensors of the particular local security system has been triggered and an identifier of the user device.

10. The method of claim 9, wherein receiving an event notification includes receiving an indication that a security device has been triggered.

11. The method of claim 9, wherein determining a user device associated with the particular local security system includes determining one or more authorized users including the user authorized to receive event notifications and determining a user device associated with the user authorized to receive event notifications to notify based on one or more notification rules.

12. The method of claim 9, further comprising:
receiving a request from the user device for additional information from the local security system including a request for video data from a camera of the local security system.

13. The method of claim 9, wherein determining a user device associated with the security system that corresponds to a user authorized to receive event notifications includes applying one or more notification rules for receiving event notifications.

14. A method comprising:
receiving at a remote service provider server system, a request from a user device for security data associated with a particular local security system, wherein the user device is distinct from the particular local security system, and wherein the security data comprises information captured by one or more devices of the particular local security system;
authenticating the user request;
responsive to authenticating the user request at the remote service provider server system, sending, from the service provider server system, a communication to a push service, the communication including one or more commands requesting a push notification be sent to the particular security system associated with the user, wherein the push notification identifies the specific security data being requested by the user device;
receiving at the service provider server system a communication request from the particular security system in response to receiving the push notification;
establishing communication between the service provider server system and the particular security system in response to the communication request;
receiving the security data responsive to the user device request; and
passing the received security data to the user device.

15. The method of claim 14, wherein authenticating the user request includes validating the user device association with the particular security system of a plurality of security systems.

16. The method of claim 14, wherein the push notification includes an identification of the requested security data.

17. The method of claim 14, wherein the push notification includes an identifier for the particular security system.

18. The method of claim 14, wherein in response to receiving the communication request from the particular security system, providing an identification of the requested security data.

19. The method of claim 14, wherein the requested security data is video content from a security camera of the security system.

20. A method comprising:
sending, from a user device, a request to establish communication to a service provider server system configured to manage communications for each of a plurality of local security systems with respective user devices, wherein the respective user devices are separate and distinct from the plurality of local security systems, and wherein the request includes authentication data to establish authorization to receive security data from a particular security system associated with the user device;
sending, from the user device, a communication to a push service, the communication including one or more commands requesting a push notification be sent to the particular security system bypassing the service provider server system, wherein the push notification to the particular security system includes an identification of the requested security data of the particular security system including a request for video data as indicated by the communication from the user device; and
receiving security data from the service provider server system, wherein the security data is provided by the particular security system to the service provider server system in response to receiving the push notification.

21. The method of claim 20, wherein the push notification includes an identifier for the security system associated with a user device.

22. The method of claim 20, wherein the requested security data includes a request for video data from a camera of the particular security system.

23. The method of claim 20, wherein the security data is received from the service provider server system in response to the service provider server system validating the user device to receive the security data based at least in part on the authentication data provided by the user device.

* * * * *